US008753414B2

(12) United States Patent
Gebert

(10) Patent No.: US 8,753,414 B2
(45) Date of Patent: Jun. 17, 2014

(54) FILTER ASSEMBLY AND MOUNTING FLANGE EXTENSION FOR GAS TURBINE FILTER ASSEMBLY

(75) Inventor: Richard Gebert, Elkton, MD (US)

(73) Assignee: W. L. Gore & Associates, Inc., Newark, DE (US)

(*) Notice: Subject to any disclaimer, the term of this patent is extended or adjusted under 35 U.S.C. 154(b) by 252 days.

(21) Appl. No.: 12/417,406

(22) Filed: Apr. 2, 2009

(65) Prior Publication Data
US 2010/0251681 A1  Oct. 7, 2010

(51) Int. Cl.
B01D 46/00 (2006.01)

(52) U.S. Cl.
USPC ............... 55/483; 55/484; 55/497; 55/502; 55/511

(58) Field of Classification Search
USPC .......... 55/490–519, 482–484, 341.1–341.7, 55/361–382, 521; 95/273–287
See application file for complete search history.

(56) References Cited

U.S. PATENT DOCUMENTS

| | | | | |
|---|---|---|---|---|
| 3,691,736 A * | 9/1972 | Neumann | ................... | 55/484 |
| 3,812,370 A * | 5/1974 | LaViolette | ............... | 422/186.12 |
| 3,953,566 A | 4/1976 | Gore | | |
| 4,225,328 A * | 9/1980 | Stiehl | ..................... | 55/378 |
| 4,643,182 A * | 2/1987 | Klein | ..................... | 128/201.25 |
| 4,735,638 A * | 4/1988 | Ciliberti et al. | ................. | 55/302 |
| 5,472,464 A | 12/1995 | Mochida | | |
| 5,788,726 A * | 8/1998 | Steele | ..................... | 55/302 |
| 5,876,471 A * | 3/1999 | Lippert et al. | ................ | 55/341.1 |
| 6,099,612 A * | 8/2000 | Bartos | ..................... | 55/481 |
| 6,183,529 B1 * | 2/2001 | Musso et al. | ..................... | 55/484 |
| 6,719,820 B2 * | 4/2004 | Wolf et al. | ..................... | 55/496 |
| 7,501,003 B2 | 3/2009 | Muller et al. | | |
| 7,588,617 B2 * | 9/2009 | Kyllonen et al. | ................ | 55/477 |
| 7,727,299 B2 * | 6/2010 | Knowles | ......................... | 55/497 |
| 2002/0121077 A1 * | 9/2002 | Kim et al. | ..................... | 55/385.1 |
| 2003/0154863 A1 * | 8/2003 | Tokar et al. | ..................... | 95/286 |
| 2005/0204922 A1 * | 9/2005 | Wu et al. | ............................. | 96/66 |
| 2006/0123990 A1 | 6/2006 | Tokar et al. | | |
| 2006/0236667 A1 * | 10/2006 | Terlson | ............................. | 55/498 |
| 2007/0113529 A1 * | 5/2007 | Gierer | ............................. | 55/498 |

FOREIGN PATENT DOCUMENTS

| | | |
|---|---|---|
| FR | 1 122 302 | 9/1956 |
| WO | WO 97/40917 | 11/1997 |
| WO | WO 00/72943 | 12/2000 |

OTHER PUBLICATIONS

International Search Report from PCT/US2010/000824.

* cited by examiner

Primary Examiner — Duane Smith
Assistant Examiner — Thomas McKenzie
(74) Attorney, Agent, or Firm — Amy L. Miller

(57) ABSTRACT

A cassette filter assembly for removing particles from an air stream, in particular from a gas stream entering a gas turbine, has an upstream end and a downstream end and comprises a mounting frame to which a filter media is fitted and which has a mounting flange extension adapted for mounting the cassette filter to an opening of a partition. The mounting flange extension is positioned between the mounting face of the partition and the mounting face of the cassette filter such that continuous filter media is disposed partially within the clean side of the filtration unit and partially within the dirty side of the filtration unit.

19 Claims, 4 Drawing Sheets

FILTER ASSEMBLY AND MOUNTING FLANGE EXTENSION FOR GAS TURBINE FILTER ASSEMBLY

FIELD OF THE INVENTION

The present invention relates to a cassette filter for removal of particles from an air stream and specifically refers to a filter assembly for installation in a filtration unit having a partition separating the filtration unit into a clean side and a dirty side. The partition has an opening in which the cassette filter assembly is mounted. The invention also particularly relates to the use of the cassette filter assembly in filtration units intended to remove particles from a gas stream entering a gas turbine as well as to the gas turbine as such, as a specific application. However, the present invention may likewise be used in filtration units used in a variety of other applications, such as in emergency power generators, gas compressors, HVAC systems, gas mining operations, and the like.

BACKGROUND OF THE INVENTION

The aforementioned applications have in common that they require a large amount of air to be filtered with high particle filtration efficiency. In some applications a single cassette filter has the capacity for filtering more than 1000 m$^3$ per hour, with a typical filter size of 600 mm×600 mm×300 mm filtering about 2,500 m$^3$ to 5,000 m$^3$ per hour. Many cassette filters may be used in parallel in order to filter an amount of air of more than 10,000 m$^3$ per hour or even more than 50,000 m$^3$ per hour. In such applications, cassette filters or cassettes are mounted in a partition which separates an upstream volume generally referred to as the "dirty air section" from a downstream volume generally referred to as the "clean air section". The partition may be in the form of a wall with openings in which the cassette filters are mounted or may be in the form of a rack defining a plurality of openings in which the cassette filters are mounted so as to create a substantially airtight partition between the dirty air and clean air sections.

Many installations have limited space on the clean air section of the filter unit due to obstructions or installed equipment. Such constraints limit the depth to which the cassette filter can extend into the clean side, and has therefore limited the size of cassette filters. The size limitation limits the amount of media that can be installed in a filter. This problem is particularly acute when retrofitting existing filter systems with high efficiency media. High efficiency media often has increased pressure drop, making it particularly important to maximize filter area when retrofitting existing media.

Cassette filters typically comprise a plurality of filter panels arranged so that pairs of panel filters form V-shapes extending from the cassette filter's upstream end to the cassette filter's downstream end. Each filter panel is composed of multiple pleats of filter media extending generally parallel to the overall filtration path, so that air or gas to be filtered passes through the pleats in a generally straight manner. The filter panels are mounted in a casing and are sealed to a mounting frame at one end of the filter. The mounting frame provides a mounting face for mounting the cassette filter to a corresponding mounting face of the partition so that the cassette filter extends into and through the opening of the partition into the clean air section. Filter cassettes may be accessed from the dirty air section side and may be easily removed and replaced.

SUMMARY OF THE INVENTION

In one aspect, a filter cassette assembly for mounting onto a partition is provided. The partition defines a plane separating a clean air side from a dirty air side of a filtration unit. The filter cassette assembly includes a filter cassette having a frame and filter media pleat pack disposed within the frame, the filter cassette having an upstream end and a downstream end and a mounting frame adjacent to the upstream end of the filter cassette, the mounting frame having a mounting face adapted for mounting the filter cassette, and a removable flange extension disposed between the partition and the mounting frame, the flange extension having a first mounting surface for attachment to the partition and a second mounting surface for attachment to the mounting frame of the filter cassette. In this aspect the removable flange extension has a depth sufficient to position a portion of the filter media pleat pack on the clean side of the filtration unit and a portion of the filter media pleat pack on the dirty side of the filtration unit.

In another aspect a filtration unit is provided. The filtration unit includes a partition defining a plane separating the clean side of the filtration unit from the dirty air side of a filtration unit, the partition further including a mounting flange extension, and a filter cassette having a frame and filter media pleat pack disposed within the frame, the filter cassette having an upstream end and a downstream end and a mounting frame adjacent to the upstream end of the filter cassette, the mounting frame having a mounting face adapted for mounting the filter cassette. In this aspect, the flange extension of the partition is of sufficient depth that a portion of the filter media pleat pack disposed within the filter cassette is on the clean side of the filtration unit and a portion of the filter media pleat pack disposed within the filter cassette is on the dirty side of the filtration unit.

In yet another aspect, an improved filtration unit of the V-bank cassette filter type is provided. The filtration unit includes a partition defining a plane separating the clean side of the filtration unit from the dirty air side of a filtration unit, a V-bank type filter cassette having a continuous media filter media pleat pack disposed within the cassette and wherein the V-bank type filter cassette has an inlet end and an outlet end and a mounting frame for attachment to a partition, the mounting frame being adjacent to the inlet end of the V-bank filter cassette. The improvement includes a flange extension disposed between the partition and the mounting frame such that the continuous filter media pleat pack disposed within the cassette is partially disposed upon the clean side of the filtration unit and partially disposed within the dirty side of the filtration unit.

In a further aspect, a method of installing a filter of the cassette filter type in which the cassette filter includes a mounting frame for attachment to a partition and in which the cassette filter includes a mounting flange adjacent to the inlet side of the cassette filter is provided. The method comprises attaching a removable flange extension to the partition, and attaching the mounting frame of the cassette filter to the removable flange extension.

In another aspect, a filter cassette assembly for mounting onto a partition is provided. The partition defines a plane separating a clean air side from a dirty air side of a filtration unit. The filter cassette assembly includes a filter cassette having an upstream end and a downstream end and a mounting frame to which filter media is fitted and which has a mounting face adapted for mounting the filter cassette, and a mounting flange extension disposed between said mounting face and the partition such that the filter cassette is positioned such that a first distance from the cassette upstream end to the partition and a second distance from the cassette downstream end to the partition, wherein the first and second distances are more than 25% of the overall length.

In another aspect, a filter cassette assembly for mounting onto a partition is provided. The partition defines a plane separating a clean air side from a dirty air side of a filtration unit. The filter cassette assembly includes the filter cassette having an upstream end and a downstream end and a mounting frame to which filter media is fitted and which has a mounting face adapted for mounting the filter cassette, and a mounting flange extension disposed between said mounting face and the partition such that the filter cassette is positioned such that a first distance from the cassette upstream end to the partition and a second distance from the cassette downstream end to the partition, wherein the first and second distances are more than 10% of the overall length.

DETAILED DESCRIPTION

The cassette filter used in embodiments of the invention described has an upstream end and a downstream end and comprises a mounting frame to which a filter media pleat pack is fitted and which has a mounting face adapted for mounting the cassette filter to an opening of a partition, as described hereinbefore in relation to the prior art.

Figure 1:
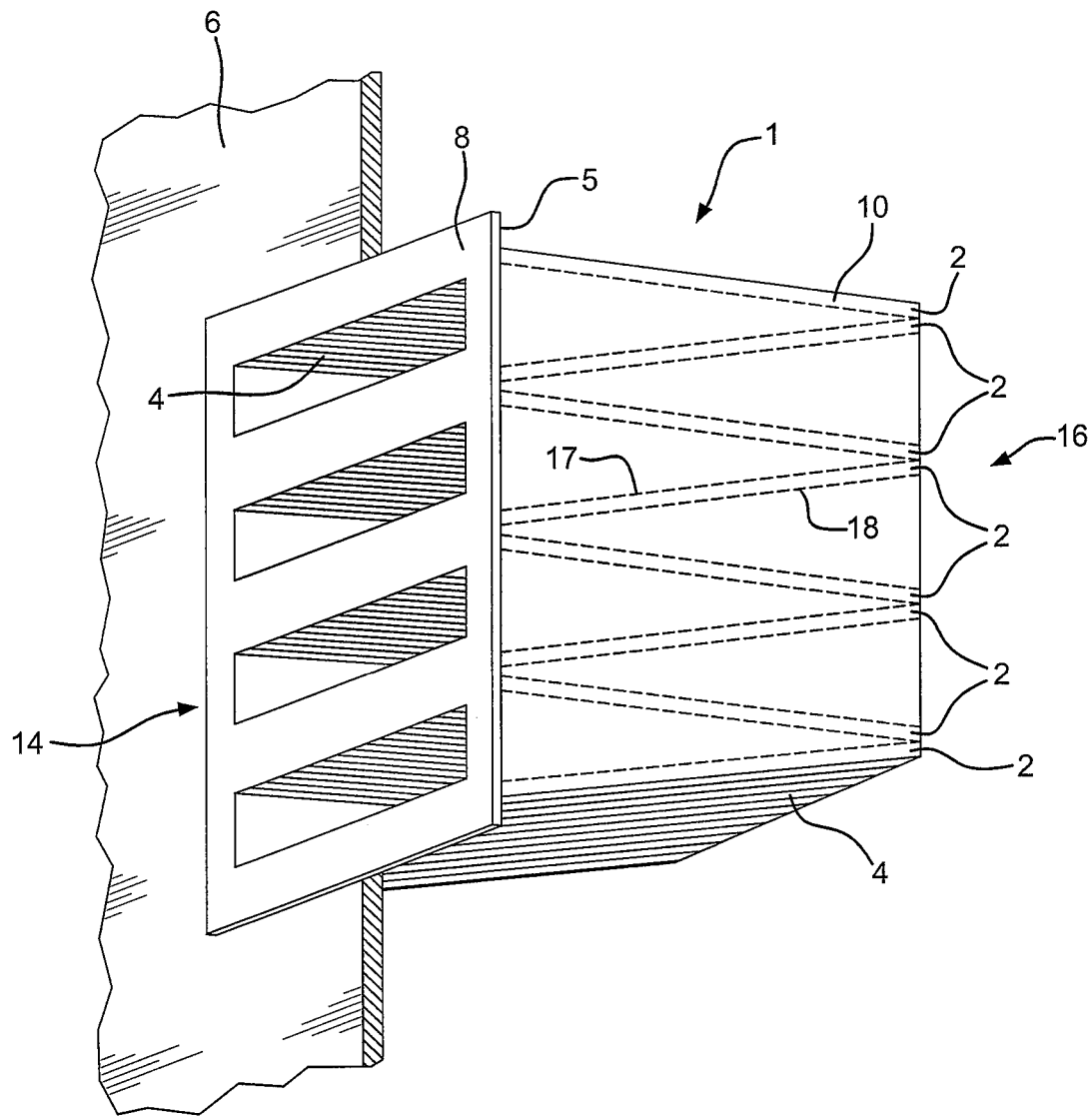
FIG. 1 is a perspective side view of a cassette filter.

FIG. 1 shows a prior art filter arrangement with a cassette filter 1 mounted in an opening of a partition 6. The partition 6 shown here has the form of a wall. The partition defines a plane which separates a clean air section at the upstream end 14 of the cassette filter 1 from a dirty air section at the downstream end 16 of the cassette filter 1. The cassette filter 1 is composed of a plurality of filter pleat packs 2 having a V-bank arrangement extending in an upstream-to-downstream direction. The pleat packs 2 are interconnected alternately at their upstream and downstream ends. The connection at the upstream end 14 is in the form of a mounting frame 8. The mounting frame 8 projects laterally so as to form a mounting face 5 on its downstream side. The mounting face 5 surrounds the filter panel package so that the cassette filter 1 can be mounted to the partition 6 via the mounting frame 8 in a substantially air tight manner wherein the mounting face 5 has a sealing function. When air to be cleaned passes through the cassette filter 1, it enters the cassette filter 1 through the openings in the mounting frame 8, passes through the filter media 4 of the filter pleat packs 2 from the upstream surface side 17 thereof to the downstream surface side 18 thereof and exits the cassette filter 1 from the cassette filter's downstream end 16. Side walls 10 provide the strength necessary to maintain the desired V-bank arrangement of the filter panels 2 and force the air to be cleaned to pass through the filter pleat packs 2.

A typical cassette filter of FIG. 1 would have a length of about 300 mm or about 400 mm and would have a filter frame of typically 592 mm×592 mm or 610 mm×610 mm. The filter frame may have a thickness of about 20 mm. Typically, three or more V-banks of filter pleat packs 2 are arranged in the filter cassette.

The cassette filter assembly as hereinafter described differs from the prior art structure described above in respect of the mounting position and mounting means. Therefore, the same reference numerals are used hereinafter to describe the embodiments of the invention.

Figure 2:
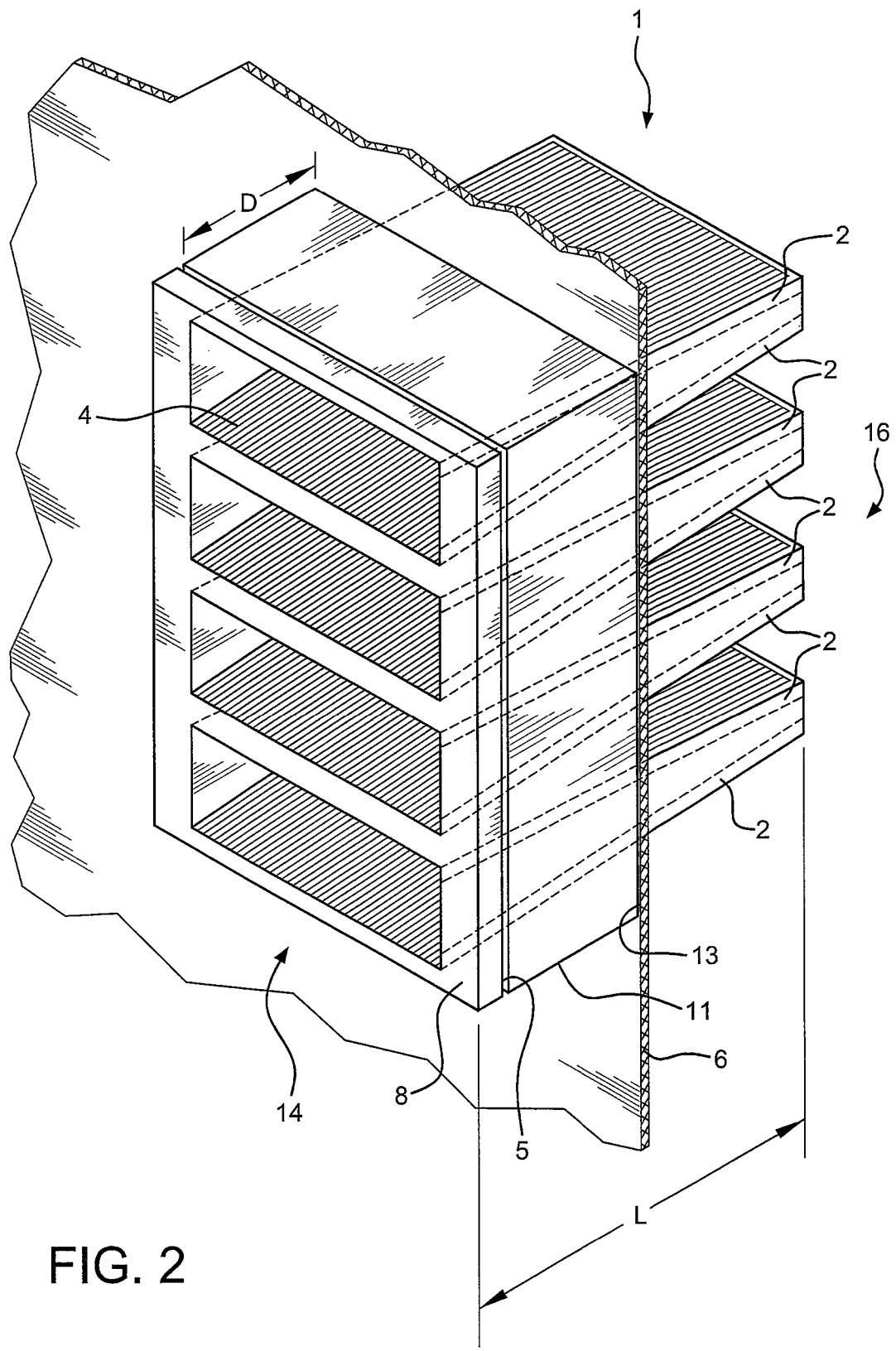
FIG. 2 shows a cassette filter assembly including the filter cassette of FIG. 1 and a flange extension according to an embodiment of the invention.
Figure 3:
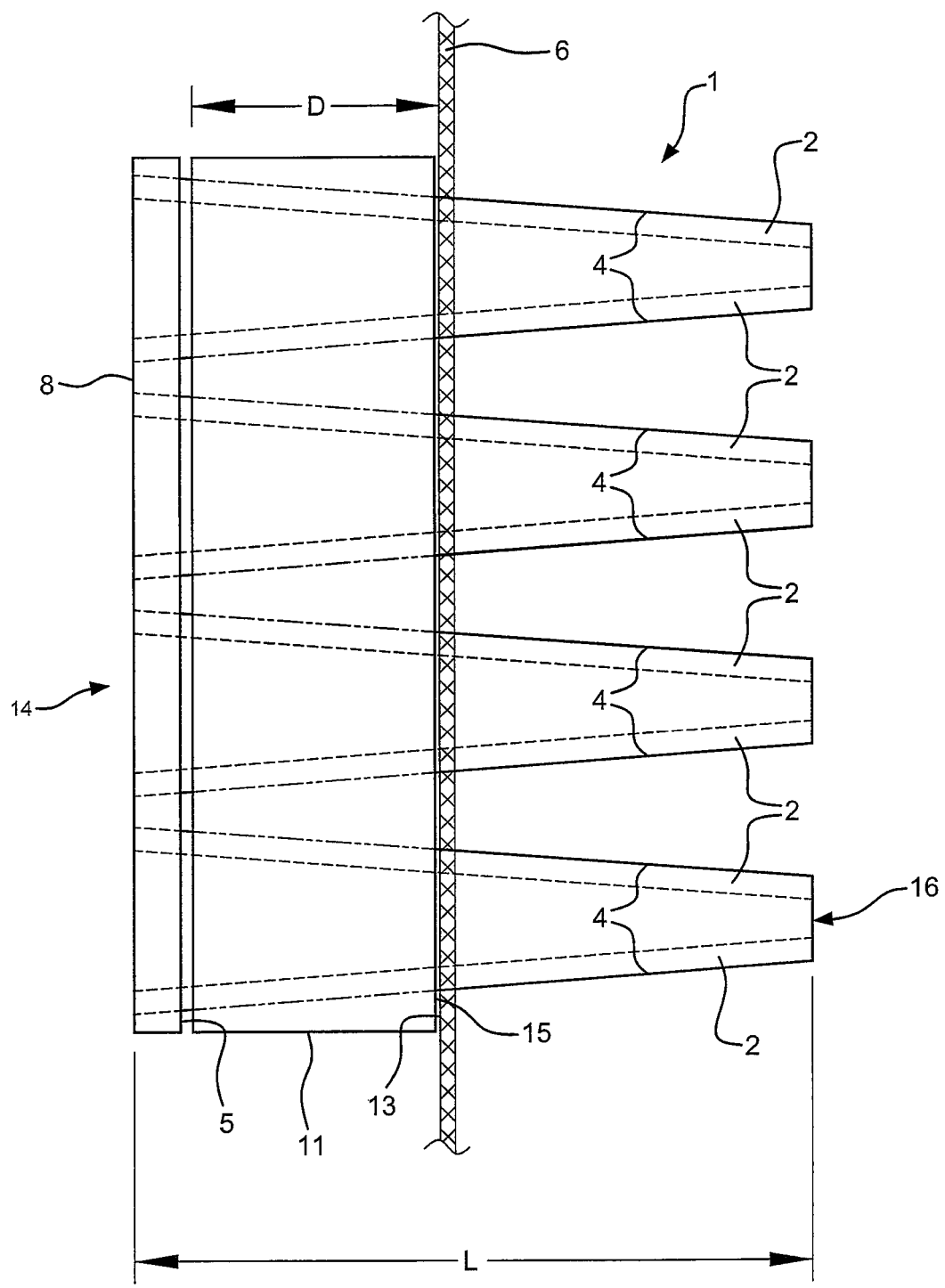
FIG. 3 shows a cassette filter assembly as installed on a partition.

FIGS. 2 and 3 show a first embodiment of a filter assembly. A cassette filter 1 is mounted in an opening of a partitioning wall 6. As in the prior art, two adjacent filter pleat packs 2 form one V-bank. The filter panels of each V-bank are air tightly connected at the cassette filter's downstream end 16, e.g. by a suitable potting material. Similarly, the filter pleat packs 2 of two adjacent V-banks are air tightly connected at the cassette filter's upstream end 14, e.g. also by means of a suitable potting material.

In contrast to the prior art, a mounting flange extension 11 is provided. The mounting flange extension 11 is connected to the filter cassette at mounting face 5. Cassette filter 1 is mounted to a corresponding mounting face 13 of the partitioning wall 6 such that partition 6 is positioned between the upstream and downstream ends 14, 16 of the cassette filter 1. As in the prior art cassette filter, air to be filtered will pass through the upstream surface sides of the filter pleat pack's 2 filter media 4 on the dirty air section side of the cassette filter 1 and exit the filter media 4 on the filter pleat packs 2 downstream surface side into the clean air section. The overall filter cassette length is L.

Mounting flange extension 11 provides stand off distance, D, from the mounting frame of the filter cassette and the dirty side of the partition 6. For a given filter length, the stand off distance provided by the mounting flange extension reduces the depth of penetration into the clean air side of the filter unit by the filter cassette 1. Accordingly, longer filters may be retrofitted into filtration units which were designed with obstructions on the clean air side of the unit. In one aspect, the mounting flange may provide at least 100 mm of stand off distance, allowing a standard 400 mm filter to be used to replace a standard 300 mm filter. This has significant advantages because it allows more filter media into each filter cassette installation. For example, this would allow more than 25 $m^2$ of filter media with less than 250 mm of filter penetration into the clean side. This is particularly advantageous when high removal efficiency media is used, as such media is often characterized by relatively high pressure drop.

The stand off distance, D, is preferably at least 10% of the overall filter length. More preferably D is at least 25% of the overall filter length, L, and most preferably D is at least 50% of the overall filter length, L. Generally, D is less than about 80% of L, such that a continuous pleated filter media pleat pack is at least partially disposed on the clean side of the filtration system and partially disposed on the dirty side of the filtration system.

It should further be noted that, although this is preferable, the mounting flange extension 11 need not entirely surround the filter panel arrangement or the partitioning wall's opening 15. For instance, if there is otherwise provided a tight fit between the filter panel arrangement and the partitioning wall's opening 15, the mounting flange extension 11 may be provided only in certain sections, e.g. on the top and bottom sides of the cassette filter, where major torque forces can be expected.

Figure 4:
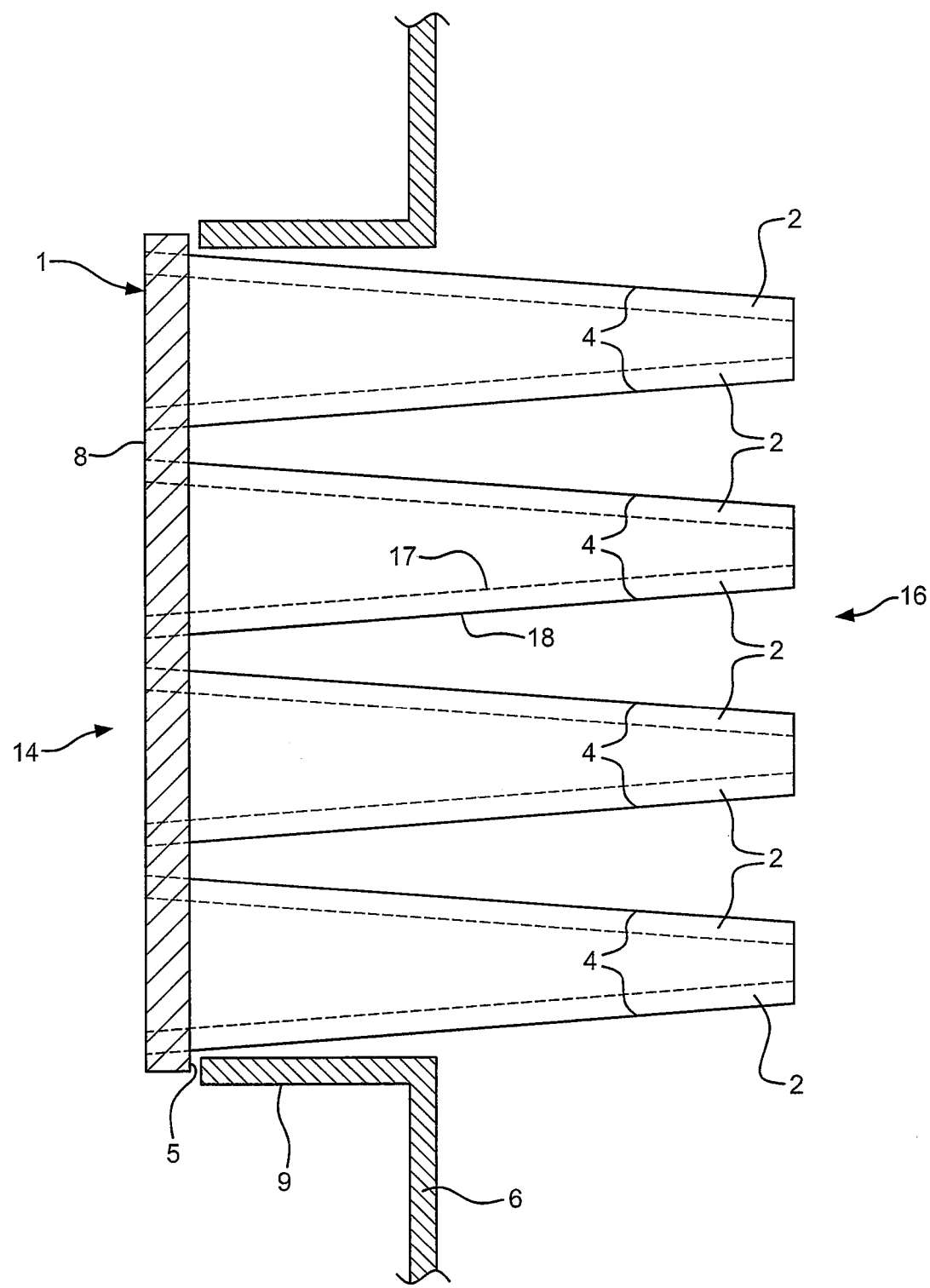
FIG. 4 shows a cassette filter assembly of another embodiment including the cassette filter assembly of FIG. 1.

In another aspect, the stand off distance provided by mounting flange extension 11 could be provided by a flange adapted and permanently attached to the partition of the filtration unit. FIG. 4 shows a flange 9 permanently attached to the partition 6. The flange 9 may be advantageously constructed of a material similar to that of the partition and may be permanently installed by welding, adhesives or fasteners and sealants.

The filter media 4 of the filter media pleat packs 2 may be pleated in an upstream-to-downstream direction as depicted generally in the Figures. However, the pleats may run in any direction. For example, the pleat may run perpendicular to the upstream-to-downstream flow. The filter media 4 may comprise cellulose or glass fibers or synthetic materials such as polyester non-woven or polypropylene non-woven. It is particularly preferred to use a composite filter media having at least two superposed filtration layers, one of which preferably is a membrane filtration layer and the other a prefiltration layer. The prefiltration layer may comprise nano fibers or glass fibers, a non-woven fibrous polymeric web, such as a spun bond, a non-woven fabric, fiber glass, micro fiber glass, cellulose or microporous membrane. Preferably the prefiltration layer is a melt blown web. The melt blown polymer fiber web layer or layers can be made from a variety of polymeric materials, including polypropylene, polyester, polyamide, polyvinylchloride, polymethylmethacrylate and polyethylene, among which polypropylene is the most preferred. Typically, the polymer fibers that form the web have a diameter in the range of about 0.05 µm to about 10 µm, preferably about 1 µm to about 5 µm.

At least one depth filtration media is formed as an electret filter media comprising a highly efficient layer having an electrostatic charge. Electric charge is imparted to the melt blown fibers to improve their filtration performance using a variety of known techniques. Downstream of the composite filter media's depth filtration layer or layers is disposed the membrane filtration layer which is intended to capture particles that pass through the depth filtration layer. A variety of microporous polymeric membranes can be used as the membrane filtration layer, depending on the requirements of the application. The membrane filtration layer may be constructed from the following exemplary materials: nitrocellulose, triacetyl cellulose, polyamide, polycarbonate, polyethylene, polypropylene, polytetrafluoroethylene, polysulfone, polyvinylidene fluoride, acrylate copolymer. The membrane filtration layer is preferably constructed from a hydrophobic material that is capable of preventing the passage of liquids. Exemplary filtration materials are described in U.S. Pat. No. 7,501,003. Preferably, the membrane filtration layer is a microporous fluoropolymer, such as an ePTFE, fluorinated ethylene propylene (FEP), perfluoroalkoxy polymer (PFA), polypropylene (PP), polyethylene (PE) or ultrahigh molecular weight polyethylene (PE-UHMW). Particularly suitable ePTFE membranes are described in U.S. Pat. No. 3,953,566. For further information on suitable materials, their properties and corresponding test methods reference is made to U.S. Pat. No. 3,953,566.

An advantage achieved with the proposed assemblies is that the surface area of the filter media can be increased without increasing the length by which the cassette filter protrudes into the clean air section. That is, the cassette filter according to the invention instead extends partly into the dirty air section and partly into the clean air section. This way, existing cassette filters can be replaced with the proposed cassette filters having a larger filter surface area without interference from obstructions.

As a result of the increased filter surface area, the filter pressure loss will decrease and lifetime will increase because less dust will be collected per unit area of the filter media and because the air will pass through the filter media at a lower velocity.

The invention claimed is:

1. A filter cassette assembly for mounting onto a partition of a filtration unit, the partition having an opening therethrough and defining a plane separating a clean air side from a dirty air side of the filtration unit, the filter cassette assembly comprising:
   a. a filter cassette having a frame and filter media pleat pack, an upstream end and a downstream end, and a mounting frame connected to the filter media pleat pack adjacent to the upstream end of the filter cassette, the mounting frame having a mounting face adapted for mounting the filter cassette, and
   b. a mounting flange extension, permanently or removably attached to the partition, and disposable to extend between the partition of the filtration unit and the mounting frame of the filter cassette, the mounting flange extension having a first mounting surface for mounting attachment to a mounting face of the partition and a second mounting surface for mounting attachment of the mounting frame of the filter cassette thereto,
wherein said mounting flange extension has a depth sufficient so that, when said first mounting surface of said mounting flange extension is mounted to said mounting face of the partition and said mounting face of said mounting frame is mounted to the second mounting surface of said mounting flange extension, said filter media pack extends through the mounting flange extension and the opening of the partition so that a portion of the filter media pleat pack is positioned on the clean side of the filtration unit with regard to the partition plane and another portion of the filter media pleat pack is positioned on the dirty side of the filtration unit with regard to the partition plane, and wherein said mounting flange extension provides a stand off distance from the mounting frame of the filter cassette to the dirty side of the partition, said stand off distance being at least 10% of the overall length of the filter cassette.

2. The filter cassette assembly of claim 1, in which the mounting flange extension provides said stand off distance to be greater than 100 mm.

3. The filter cassette assembly of claim 1 in which a flat sheet area of the filter media pleat pack is greater than 25 m$^2$ and the filter cassette extends less than 250 mm into the clean side of the filtration unit with regard to the partition plane.

4. The filter cassette assembly of claim 3 in which the filter cassette has a removal efficiency class of Filter class H11 or greater according to EN 1822-1-1998.

5. The filter cassette assembly of claim 1 in which a flat sheet area of the filter media is greater than 32 m$^2$ and the filter cassette extends less than 350 mm into the clean side of the filtration unit with regard to the partition plane.

6. A method of installing a filter of the cassette filter type in which the cassette filter includes a filter media pack connected to a mounting frame provided for attachment to a partition of a filtration unit, said mounting frame being adjacent to an inlet side of the cassette filter, wherein the method comprises:
   a. mounting by attachment a removable mounting flange extension to the partition, and
   b. mounting by attachment the mounting frame and connected filter media pack of the cassette filter to the removable flange extension,
wherein said removable mounting flange extension has a depth sufficient so that an said filter media pack extends through the flange extension and an opening of the partition to position a portion of the filer media pleat pack on a clean side of the partition of the filtration unit and another portion of the filter media pleat pack on a dirty side of the partition of the filtration unit, and wherein said mounting flange extension provides a stand off distance from the mounting frame of the filter cassette to the dirty side of the partition, said stand off distance being at least 10% of the overall length of the filter cassette.

7. The filter cassette assembly of claim 1, wherein said filter media pleat pack comprises a V-bank type filter cassette having a continuous filter media disposed within the filter cassette with an inlet end and an outlet end.

8. The filter cassette assembly of claim 1, wherein when said first mounting surface of said mounting flange extension is mounted to said mounting face of the partition and said mounting face of said mounting frame is mounted to the second mounting surface of said mounting flange extension, said mounting flange extension is disposed so that the upstream end of the filter cassette is positioned a first distance from the partition and the downstream end of the filter cassette is positioned a second distance from the partition, wherein said first distance and said second distance are each more than 10% of the overall length of the filter cassette.

9. The filter cassette assembly of claim 8, wherein when said first mounting surface of said mounting flange extension is mounted to said mounting face of the partition and said mounting face of said mounting frame is mounted to the second mounting surface of said mounting flange extension, said mounting flange extension is disposed so that the upstream end of the filter cassette is positioned a first distance from the partition and the downstream end of the filter cassette is positioned a second distance from the partition, wherein said first distance and said second distance are each more than 25% of the overall length of the filter cassette.

10. A filter cassette assembly for mounting onto a partition of a filtration unit, the partition having an opening therethrough and defining a plane separating a clean air side from a dirty air side of the filtration unit, the filter cassette assembly comprising:
  a filter cassette having a frame and filter media pleat pack, an upstream end and a downstream end, and a mounting frame connected to the filter media pleat pack adjacent to the upstream end of the filter cassette, the mounting frame having a mounting face adapted for mounting the filter cassette, wherein said filter media pleat pack comprises a V-bank type filter cassette pleated in an upstream-to-downstream direction, and
  a mounting flange extension, permanently or removably attached to the partition, and disposable to extend between the partition of the filtration unit and the mounting frame of the filter cassette, the mounting flange extension having a first mounting surface for mounting attachment to a mounting face of the partition and a second mounting surface for mounting attachment of the mounting frame of the filter cassette thereto, wherein said mounting flange extension has a depth sufficient so that, when said first mounting surface of said flange extension is mounted to said mounting face of the partition and said mounting face of said mounting frame is mounted to the second mounting surface of said mounting flange extension said filter media pack extends through the mounting flange extension and the opening of the partition so that a portion of the filter media pleat pack is positioned on the clean side of the filtration unit with regard to the partition plane and another portion of the filter media pleat pack is positioned on the dirty side of the filtration unit with regard to the partition plane.

11. The filter cassette assembly of claim 10, wherein when said first mounting surface of said mounting flange extension is mounted to said mounting face of the partition and said mounting face of said mounting frame is mounted to the second mounting surface of said mounting flange extension, said mounting flange extension is disposed so that the upstream end of the filter cassette is positioned a first distance from the partition and the downstream end of the filter cassette is positioned a second distance from the partition, wherein said first distance and said second distance are each more than 25% of the overall length of the filter cassette.

12. The filter cassette assembly of claim 11, wherein when said first mounting surface of said mounting flange extension is mounted to mounting face of the partition and said mounting face of said mounting frame is mounted to the second mounting surface of said mounting flange extension, said mounting flange extension entirely surrounds said filter cassette between the partition and the mounting frame.

13. The filter cassette assembly of claim 10, wherein said V-bank type filter cassette has a continuous filter media disposed within the filter cassette with an inlet end and an outlet end.

14. The filter cassette assembly of claim 13, wherein a flat sheet area of the filter media pleat pack is greater than 25 m$^2$ and the filter cassette extends less than 250 mm into the clean side of the filtration unit with regard to the partition plane.

15. The filter cassette assembly of claim 13, wherein said V-bank type filter cassette comprises a plurality of V-banks that each include two adjacent filter pleat packs air tightly connected at the downstream end of the filter cassette, and wherein adjacent ones of said plurality of V-banks are air tightly connected at said upstream end of the filter cassette.

16. The filter cassette assembly of claim 1, wherein said mounting flange extension entirely surrounds said filter cassette between the partition and the mounting frame.

17. The method of claim 6, wherein said mounting flange extension is attached to the partition on said dirty air side of said filtration unit.

18. The method of claim 17, wherein said mounting frame of the cassette filter is attached to the mounting flange extension on the dirty air side of the filtration unit.

19. The filter cassette assembly of claim 1, wherein said partition is in the form of a wall of said filtration unit.

* * * * *